US007401350B1

(12) United States Patent
Asada

(10) Patent No.: US 7,401,350 B1
(45) Date of Patent: Jul. 15, 2008

(54) LOCAL AREA INFORMATION TERMINAL DEVICE

(75) Inventor: Jun Asada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/158,076

(22) Filed: Sep. 22, 1998

(30) Foreign Application Priority Data

Mar. 16, 1998 (JP) .................................. 10-065938

(51) Int. Cl.
*H04N 7/18* (2006.01)
*H04N 7/173* (2006.01)

(52) U.S. Cl. ........................... 725/81; 725/123; 370/313
(58) Field of Classification Search ............. 725/80–81, 725/123; 370/313; 455/450–454
See application file for complete search history.

(56) References Cited

U.S. PATENT DOCUMENTS

| | | | | |
|---|---|---|---|---|
| 3,649,764 | A * | 3/1972 | Maillet ........................ | 370/324 |
| 4,555,806 | A * | 11/1985 | Lange et al. ................. | 714/708 |
| 5,600,635 | A | 2/1997 | Hamaki et al. | |
| 5,630,204 | A * | 5/1997 | Hylton et al. ............... | 725/116 |
| 5,729,541 | A * | 3/1998 | Hamalainen et al. ........ | 370/337 |
| 5,732,074 | A * | 3/1998 | Spaur et al. ................. | 370/313 |
| 5,794,116 | A * | 8/1998 | Matsuda et al. ............. | 725/114 |
| 5,950,136 | A * | 9/1999 | Scott ........................ | 455/452.1 |
| 5,956,716 | A * | 9/1999 | Kenner et al. ............... | 707/10 |
| 5,974,449 | A * | 10/1999 | Chang et al. ................ | 709/206 |
| 6,009,247 | A * | 12/1999 | Canora et al. ............... | 710/100 |
| 6,215,413 | B1 * | 4/2001 | Gaskill ........................ | 340/5.1 |
| 6,282,714 | B1 * | 8/2001 | Ghori et al. .................. | 725/81 |
| 6,330,609 | B1 * | 12/2001 | Garofalakis et al. ......... | 709/229 |

FOREIGN PATENT DOCUMENTS

| | | |
|---|---|---|
| EP | 0 537756 | 4/1993 |
| JP | 56-6668 | 2/1981 |
| JP | 59-95736 | 6/1984 |
| JP | 60-144085 | 7/1985 |
| JP | 4-86035 | 3/1992 |
| JP | 4-213933 | 8/1992 |
| JP | 4-507158 | 12/1992 |
| JP | 5-22222 | 1/1993 |
| JP | 5-122173 | 5/1993 |
| JP | 6-53858 | 2/1994 |
| JP | 6-204940 | 7/1994 |
| JP | 6-237123 | 8/1994 |
| JP | 6-301445 | 10/1994 |
| JP | 7-283781 | 10/1995 |

(Continued)

OTHER PUBLICATIONS http://members.fortunecity.com/pcmuseum/windows.htm.*

(Continued)

*Primary Examiner*—Hunter B. Lonsberry
(74) *Attorney, Agent, or Firm*—Staas & Halsey LLP

(57) ABSTRACT

Mobile terminals capable of transmitting and receiving HTML data etc. are prepared for actualizing simple bidirectional communications specified in a local area, and some broadcasting channels are prepared for ensuring the communications between the mobile terminals. A contrivance is that a receiver is able to transmit a return mail with respect to the broadcasting data received via the broadcasting channel, and the bidirectional communications at a stage just before persons concerned meet directly each other can be actualized.

20 Claims, 7 Drawing Sheets

FOREIGN PATENT DOCUMENTS

| | | |
|---|---|---|
| JP | 7-336370 | 12/1995 |
| JP | 8-5394 | 1/1996 |
| JP | 8-51393 | 2/1996 |
| JP | 8-149035 | 6/1996 |
| JP | 8-186873 | 7/1996 |
| JP | 8-251068 | 9/1996 |
| JP | 9-51314 | 2/1997 |
| JP | 9-74368 | 3/1997 |
| JP | 9-93014 | 4/1997 |
| JP | 9-505449 | 5/1997 |
| JP | 9-160986 | 6/1997 |
| JP | 9-162818 | 6/1997 |
| JP | 9-182038 | 7/1997 |
| JP | 9-182135 | 7/1997 |
| JP | 9-245147 | 9/1997 |
| JP | 10-23548 | 1/1998 |
| JP | 10-41740 | 2/1998 |

OTHER PUBLICATIONS http://members.fortunecity.com/pcmuseum/windows.htm.*
Geoffrey M. Voelker et al. "Mobisaic: An Information System for a Mobile Wireless Computing Environment". 1995, pp. 185-190; p. 1.
Hata et al., Dynamic Ham Series vol. 6, Packet Communication Handbook, p. 1-13, p. 2-56.

* cited by examiner

LOCAL AREA INFORMATION TERMINAL DEVICE

BACKGROUND OF THE INVENTION

The present invention relates to an information processing apparatus for transmitting and receiving information through radio communications.

In recent years, a variety of communications architectures have been structured with advancements of information processing apparatuses. There can be given a multiplicity of examples such as television broadcasting and radio broadcasting in the form of one-way communications oriented to a multiplicity of unspecified receivers, and a portable telephone and a PHS (Personal Handy-phone System) etc., in the form of bidirectional communications between specified individuals.

Further, with a preparation of the INTERNET in recent years, it is feasible to have an easy access to WWW (World Wide Web) information in the world. Hypertext information mixed with texts and images, which are used therefor, are going to be settled down as new information expressing means.

In providing the WWW information through the INTERNET, however, the world-wide information can be collected, and while on the other hand there has not yet been established such a technology as to certainly activate communications between target users in a given local area by transmitting the information to within this local area.

What is known in this connection is a technology for combining television broadcasting with INTERNET, which is disclosed in Japanese Patent Application Laid-Open No. Hei 9-162818. According to this technique shown therein, domain information of INTERNET is multiplexed in TV broadcasting signals and then transmitted.

Further, Japanese Patent Application Laid-Open No. Hei 5-122173 by the present application discloses a technique of transferring from a base station the information exhibiting a prompt reporting characteristic such as newspaper to portable terminal devices by feeble radio waves. Moreover, there is also known a technique of distributing the information only to the users existing in a specified area by using local media such as a mini-FM station.

Those techniques might be effective in combining the INTERNET technology with the broadcasting technology and providing the information to a specified local area.

Each of those conventional techniques, however, deals with the one-way communications from the broadcasting station to the users. Accordingly, the users are unable to readily transmit the information to each other in the same manner as receiving the information.

SUMMARY OF THE INVENTION

The present invention has been made in view of the above circumstances, and therefore has an object of the present invention to provide bidirectional communications at low costs which are limited to a specified local area by utilizing a simple INTERNET technology.

According to a first aspect of the present invention, a local area information terminal comprises a file storing unit for storing a file previously created by a transmitter, a channel retrieving unit for retrieving a free channel among broadcasting channels allocated to respective frequency bandwidths, a channel selecting unit for selecting a free channel among a plurality of free channels, and a transmitting unit for transmitting the file as broadcasting data stored in the file storing unit to within a local area via the selected channel.

The file consists of a file of text data, image data, audio data, or the like, and can be normally created on a personal computer.

The channel herein implies a bandwidth defined per frequency of the broadcasting within the local area, and according to the present invention, 2 to 3 channels are set within the same local area. Further, the local area herein implies a specified local area having a radius of, e.g., 500 m or less, and persons having the information terminals are also able to meet each other by actualizing the bidirectional communications in this range.

According to a second aspect of the present invention, the local area information terminal comprises, in addition to the components according to the first aspect, a cipher processing unit, and the file read from the file storing unit is encrypted by the cipher processing unit and thereafter transmitted.

The broadcasting oriented to the specified receivers existing within the local area can be carried out by executing the encrypting process upon the broadcasting data.

According to a third aspect of the present invention, the file is a file in an HTML (HyperText Markup Language) format. The file in the HTML format is a text file structured of tags such as <html>, <title>, <body> (ornament symbols) and character information. In this text file, the image data can be displayed by use of the tags. In the case of the HTML text, for example, <img src="suna.jpg"> is simply shown, and an image such as suna.jpg can be displayed in a position of this tag.

According to a fourth aspect of the present invention, a local area information terminal for selectively receiving broadcasting information transmitted via a plurality of channels within a local area, comprises a retrieving unit for retrieving a channel through which the broadcasting data can be received, a selecting unit for selecting, when the broadcasting data different from each other are being transmitted via the plurality of channels, a receiving channel, a displaying unit for displaying the broadcasting data received by the selected channel, an identifier storing unit for extracting an identifier for specifying a transmitter out of the broadcasting data and storing the identifier, a mail editing unit for creating a return message to the transmitter on the basis of the transmitter identifier read from the identifier storing unit, and a returning unit for returning the mail created by the mail editing unit.

The fourth aspect of the invention corresponds to the first aspect showing the transmitting terminal, wherein the broadcasting data being transmitted from some transmitting terminals within the local area are received by selecting the channels. Further, the identifier storing unit is stored with the transmitter identifiers, i.e., the IDs in the broadcasting data, whereby the return mail can be transmitted to the broadcaster. The bidirectional communications within the local area can be thus actualized.

According to a fifth aspect of the present invention, the local area information terminal further comprises a cipher processing unit. The cipher processing unit, if the broadcasting data received have been encrypted, decodes the encrypted data by decrypting the same data. The construction according to the fifth aspect of the invention corresponds to the case where the broadcasting data have been encrypted.

According to a sixth aspect of the present invention, a local area information terminal capable of transmitting and receiving broadcasting data within a local area, comprises a file storing unit for storing a file previously created by a transmitter, a channel retrieving unit for retrieving a free channel among broadcasting channels allocated to respective frequency bandwidths, a transmitting unit for transmitting the file as broadcasting data stored in the file storing unit to within a local area via the retrieved channel, a retrieving unit for retrieving a channel through which the broadcasting data can be received within the local area, a selecting unit for selecting, when the broadcasting data different from each other are being transmitted via the plurality of channels, a receiving channel, and a displaying unit for displaying the broadcasting data received via the selected channel. The information terminal according to the sixth aspect of the invention incorporates both of a function serving as the transmitting terminal according to the first aspect of the invention and a function serving as the receiving terminal according to the fourth aspect of the invention, and is capable of, though these two functions are incorporated therein, making hardware mechanisms common such as the channel retrieving unit for the transmission and the channel selection unit for the receipt. It is therefore feasible to actualize the local area information terminal capable of transmitting and receiving the broadcasting data without any scale-up.

According to a seventh aspect of the present invention, the local area information terminal according to the sixth aspect of the invention further comprises a mail editing unit for creating a return mail to a transmitter of the broadcasting data received, and a returning unit for returning the return mail. With an addition of the function of not only receiving the broadcasting data but also transmitting the return mail to the broadcaster, the communications within the local area can be more activated.

According to an eighth aspect of the present invention, the local area information terminal further comprises an identifier storing unit for extracting an identifier for specifying a transmitter out of the broadcasting data and storing the identifier. Moreover, the mail editing unit sets a return destination of the return mail to the transmitter on the basis of the transmitter identifier read from the identifier storing unit. The return mail can be thereby simply transmitted to the broadcaster without being conscious of the mail address.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Embodiments of the present invention will hereinafter be described with reference to the accompanying drawings.

Figure 1:
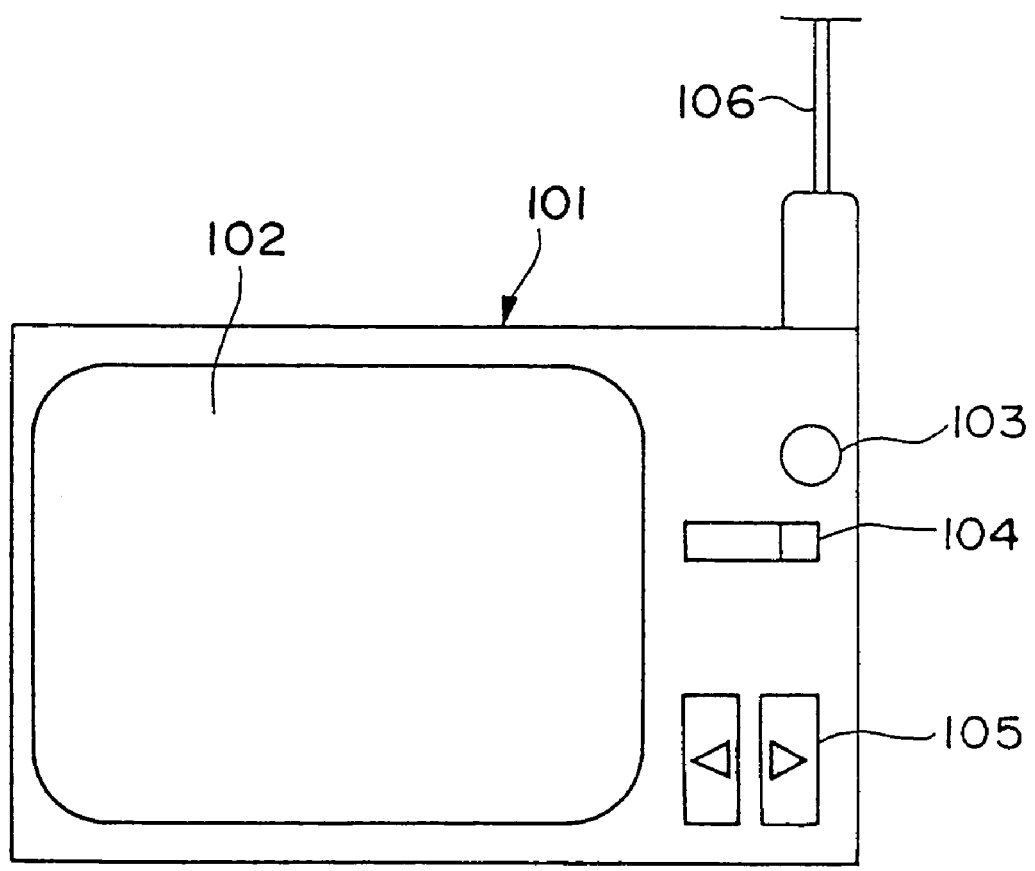
FIG. 1 is a plan view showing an information processing apparatus according to one embodiment of the present invention.

FIG. 1 shows an information processing apparatus by way of one embodiment of the present invention.

An information processing apparatus 101 has a portable casing the surface of which is provided with a display screen 102, a power source switch 103, a mode selection switch 104 and a channel selection button 105. Further, an antenna 106 is provided at an upper portion thereof.

The display screen 102 is constructed of a color liquid crystal display, in which a positional input indication can be effected upon the surface thereof through a touch panel using a touch pen or the like. The mode selection switch 104 consists essentially of a slide switch, in which it is selectable whether the information processing apparatus 101 is used in a receiving mode or in a transmitting mode. The channel selection button 105 serves to select a channel when in a transmitting or receiving process. File data in an HTML format are transmitted as broadcasting data through radio waves from the antenna 106. Further, the radio waves transmitted other users are received by the antenna 16. A concept of this channel selection will be explained later on.

Figure 2:
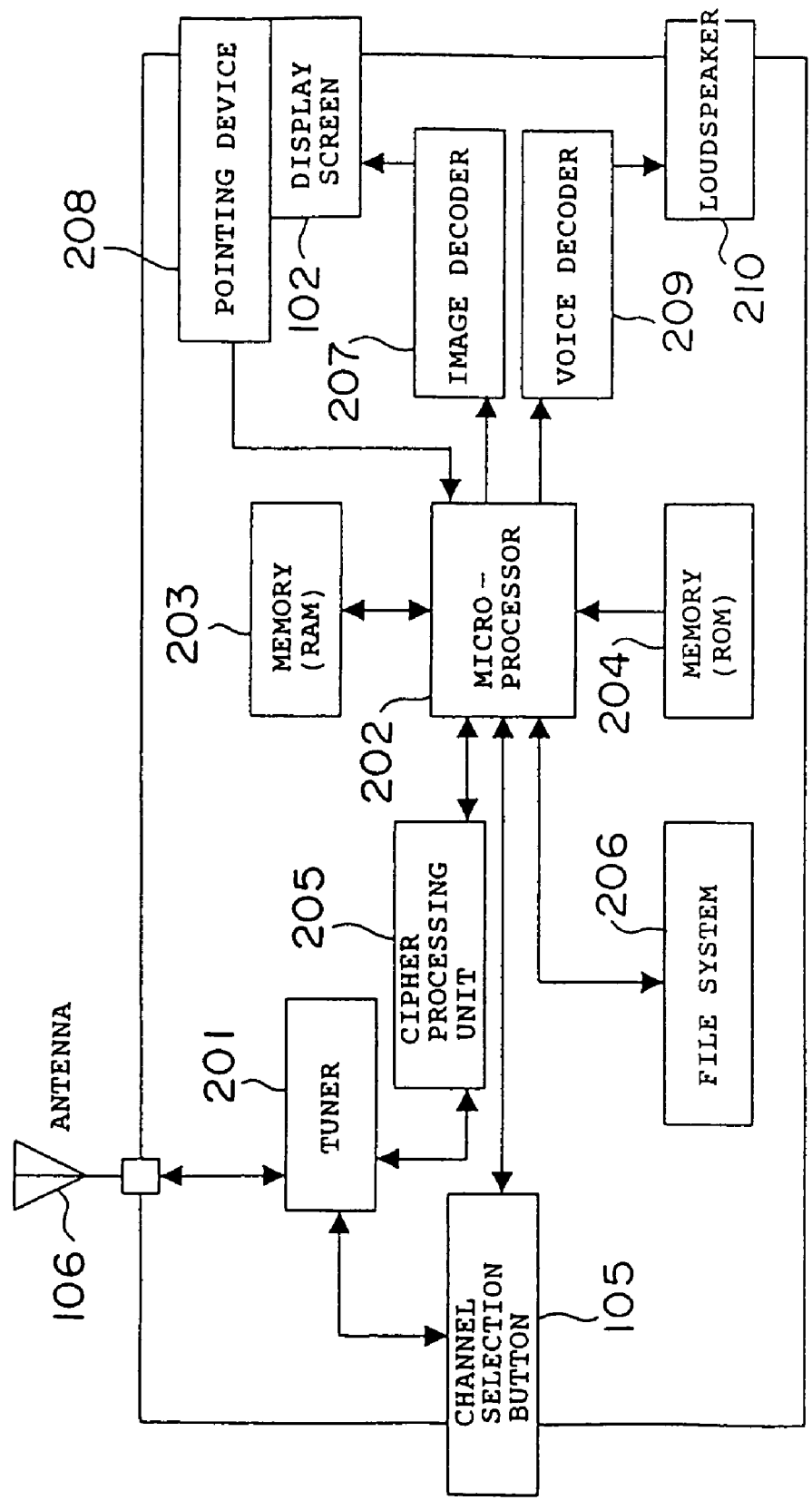
FIG. 2 is a block diagram illustrating an internal construction of the information processing apparatus according to the embodiment.

FIG. 2 is a block diagram showing an internal hardware architecture of the information processing apparatus 101.

The information processing apparatus 101 is constructed based on a microprocessor 202, and includes a memory (ROM) 204 for storing an initialization program, a communication program, a mail editor, and the like of the microprocessor 202, a memory (RAM) 203 for temporarily storing the above respective programs and data, and a file system 206 for storing in the form of file the data in the HTML (HyperText Markup Language) format or the hypertext format, which data are created by the user. Herein, the file system 206 is structured of card slots etc., and may involve the use of a PC card (pursuant to PCMCIA: Personal Computer Memory Card International Association) constructed of a flash memory which is inserted into the card slot. Accordingly, the HTML data are previously created by the user using other personal computer and transferred to the PC card, whereby the information processing apparatus 101 reads the HTML file from this PC card attached thereto, thus executing a transmitting process.

The information processing apparatus 101 includes a tuner 201 as a communication system thereof, and a transmitting or receiving frequency can be changed over by operating the channel selection button 105 functioning as a channel-select switch 105.

A cipher processing unit 205 is provided between the tuner 201 and the microprocessor 202. The cipher processing unit 205 incorporates a function of encrypting the HTML data transmitted from the information processing apparatus 101, and has a function of returning to a plaintext the HTML data by executing an algorithm reversed to the encryption algorithm when the information processing apparatus 101 receives the encrypted HTML data. The cipher processing unit 205, to be specific, functions when desiring for notifying a specified user of the information.

The display screen 102 is composed of an LCD as an input system of the information processing apparatus 101, and the touch panel provided on the surface thereof functions as a pointing device 208. An image displayed on the display screen 102 is outputted by an image decoder 207.

The information processing apparatus 101 includes a loudspeaker 210 as an output system thereof, which is provided on the side of a rear surface not shown in FIG. 1, and voice information is reproduced through a voice decoder 209.

Figure 3:
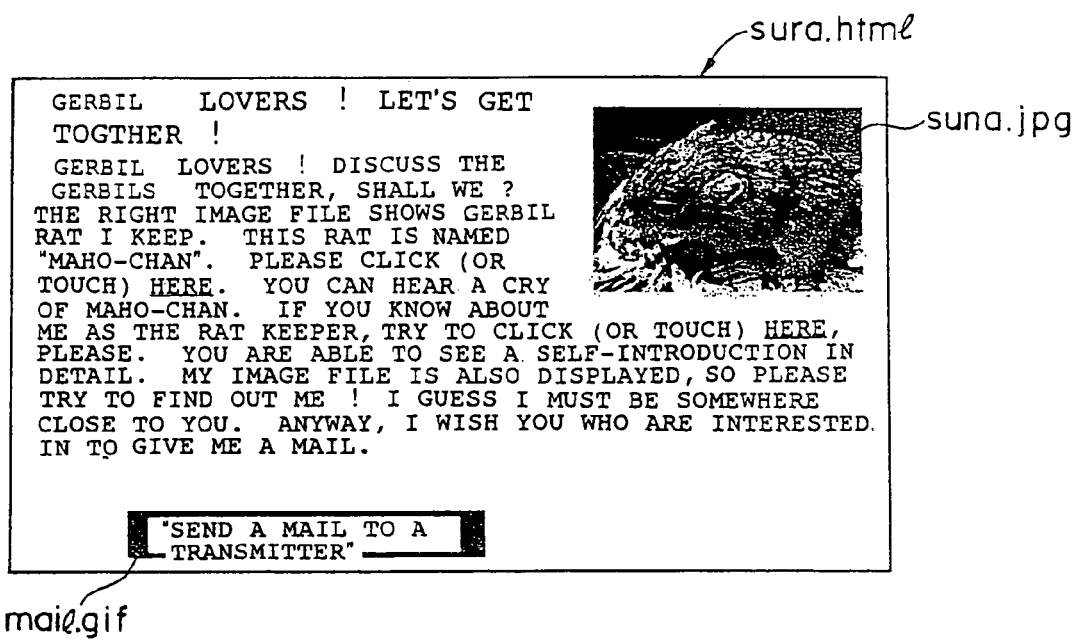
FIG. 3 is an explanatory diagram showing a content of broadcasting data according to the embodiment.
Figure 4:
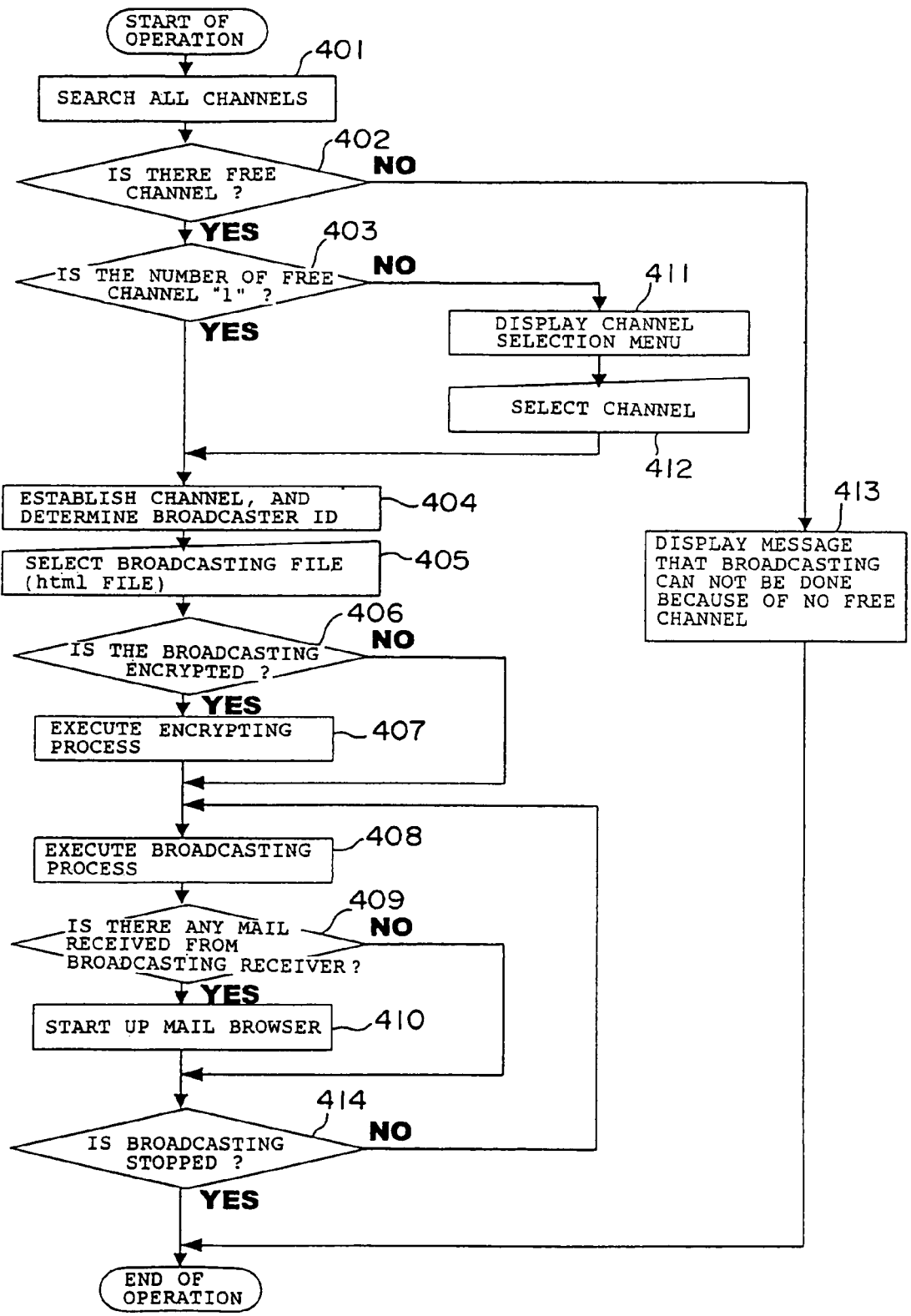
FIG. 4 is a flowchart showing procedures when transmitting the broadcasting data in the information processing apparatus according to the embodiment.

Explained next is a case in which the HTML data (suna.html) as shown in FIG. 3 are transmitted by use of the information processing apparatus 101.

The HTML data shown in FIG. 3 are structured of a suna.html file defined as text data, a suna.jpg file defined as image data, and a mail.gif file defined as a button image, and these files are generated and edited on the personal computer. The user, after making the unillustrated PC card stored with the above three files, attaches the PC card to the information processing apparatus 101. The three files to be transmitted are thus brought into a set-up state in the file system 206.

To begin with, a transmitter sets the information processing apparatus 101 in the transmitting mode by manipulating the mode selection switch 104. The microprocessor 202 indicates the tuner 201 to judge by a retrieval whether or not there is a free channel through which no broadcasting is conducted at present (step 401). In this case, if the broadcasting is already conducted through all the channels in a local area concerned (which extends with a radius of approximately 500 m), a message "Broadcasting is unable to be done because of no'free channels" is displayed on the display screen 102 through the image decoder 207 (step 413), and the transmitting process comes to an end. While on the other hand, there exist free channels (step 402) the number of which is 2 or more. In this case, the microprocessor 202 makes a channel selection menu displayed on the display screen 102 through the image decoder 207 (step 411), and indicates the transmitter to select a transmission channel by manipulating the channel selection button 105 (step 412).

Note that if there are, though not shown in the flowchart, a plurality of free channels, the broadcasting channels may be automatically selected starting from a lower-number channel.

When the broadcasting channel is established, the microprocessor 202 sets an ID of a broadcaster (step 404). This ID may involve the use of an INTERNET address of the transmitter which is stored in the memory RAM as user information of the information processing apparatus 101. The ID is, however, limited to this broadcasting, and an ID generated from a random number by the microprocessor may also be used.

Next, a file list in the file system 206 is displayed on the display screen 102, and the transmitter selects a broadcasting file by using the channel selection button 105 from this file list (step 405). At this time, if the suna.html file serving as a basis when used as a broadcasting file is selected on the display screen 102, the suna.jpg file and the mail.gif file that are link-set by this suna.html file are also simultaneously selected.

Next, the display screen 102 turns out to be a selection screen showing whether to encrypt the broadcasting file (step 406).

In this case, in the case of the information desired to be broadcasted to only a specified user group, the encrypting process is such that the encrypted broadcasting file is transmitted, and only receivers having IDs permitted to receive the broadcasting file are able to receive the information content. Such being the encrypting process, it is feasible to actualize also commercial broadcasting in which an area for collecting charges for receiving the information is limited.

When the encrypting process is selected in step 406, the cipher processing unit 205 executes the process of encrypting the broadcasting file (suna.html, suna.jpg and mail.gif) (step 407). The encryption herein may use a known encrypting algorithm such as, e.g., a public key cryptosystem.

Next, the microprocessor 202 executes the broadcasting process through the tuner 201 (step 408).

With the processes executed above, the information shown in FIG. 3 can be received relatively far around the information processing apparatus 101 of the transmitter. When the transmitter receives a mail from the receiver (step 409), though receiving procedures will be explained in greater details referring to FIG. 5, the microprocessor 202 starts up a mail browser from the memory 204 (ROM) (step 410), and displays the received mail on the display screen 102.

The mail browser enables the mail to be transmitted back, in which a mail address of the received mail is used as a transmission-back address. This point is a technique already known from the general-purpose INTERNET browser, and hence the explanation thereof is omitted.

Figure 5:
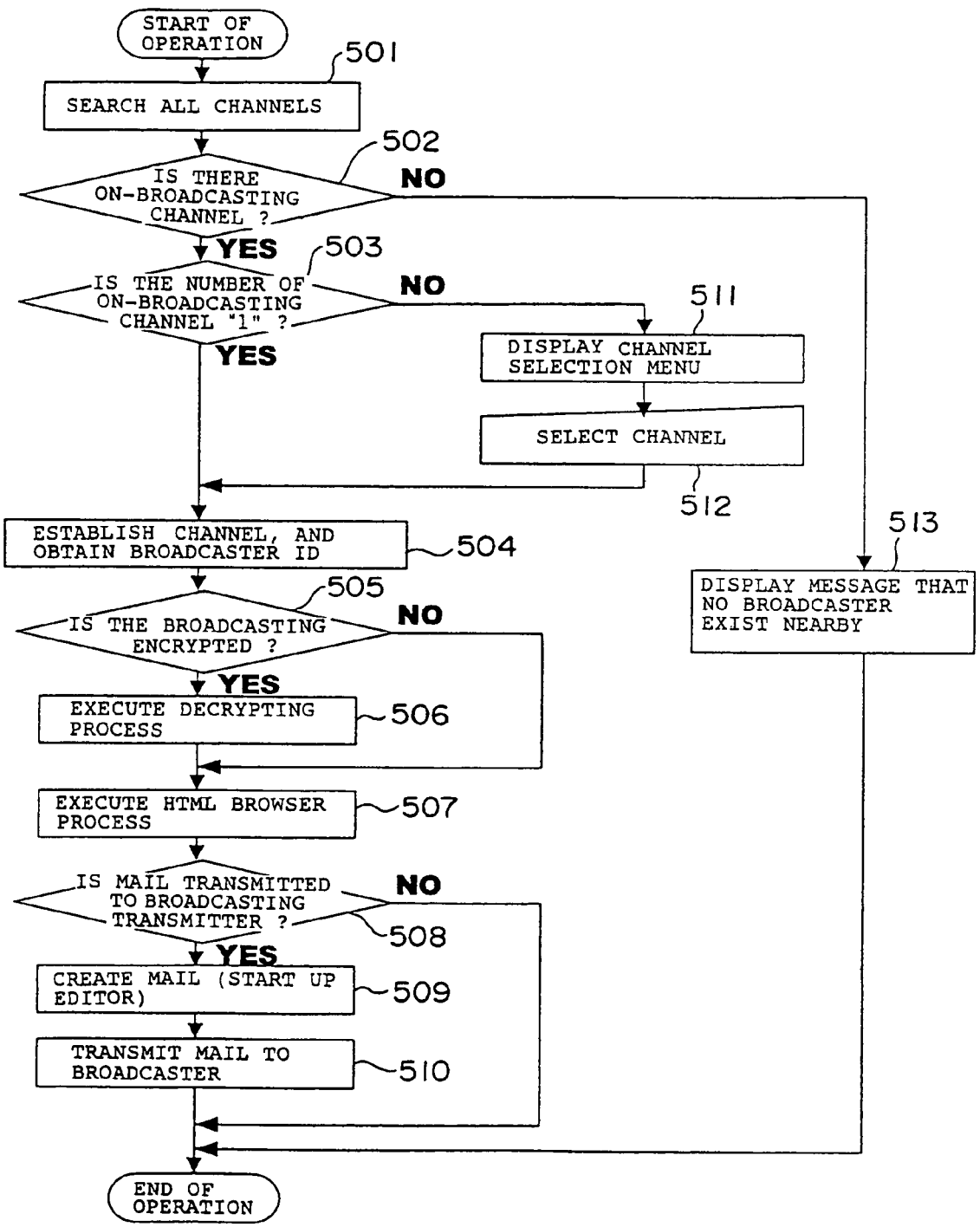
FIG. 5 is a flowchart showing procedures when receiving the broadcasting data in the information processing apparatus according to the embodiment.

Next, the procedures by which the information processing apparatus 101 receives the broadcasting, will be explained with reference to FIGS. 5 to 7.

The receiver sets the mode selection switch 104 in the receiving mode by turning ON the power source switch 103 of the information processing apparatus 101, at which time the microprocessor 202 retrieves all the channels through the tuner 201 (step 501) and judges whether or not there is a channel through which the broadcasting is conducted. In this case, if there is no channel through which the broadcasting is conducted, the micro processor 202 displays, via the image decoder 207 on the display screen 102, a message such as "No broadcaster exists in a vicinal area" or "No broadcasting is carried out at present in this area" (step 513).

In this step 502, if an on-the-broadcasting channel is detected, an on-the-broadcasting channel number is judged (step 503). In this case, if there are plurality of on-the-broadcasting channels, the microprocessor 202 displays a channel selection menu as shown in FIG. 7 on the display screen 102 (step 511).

Figure 6:
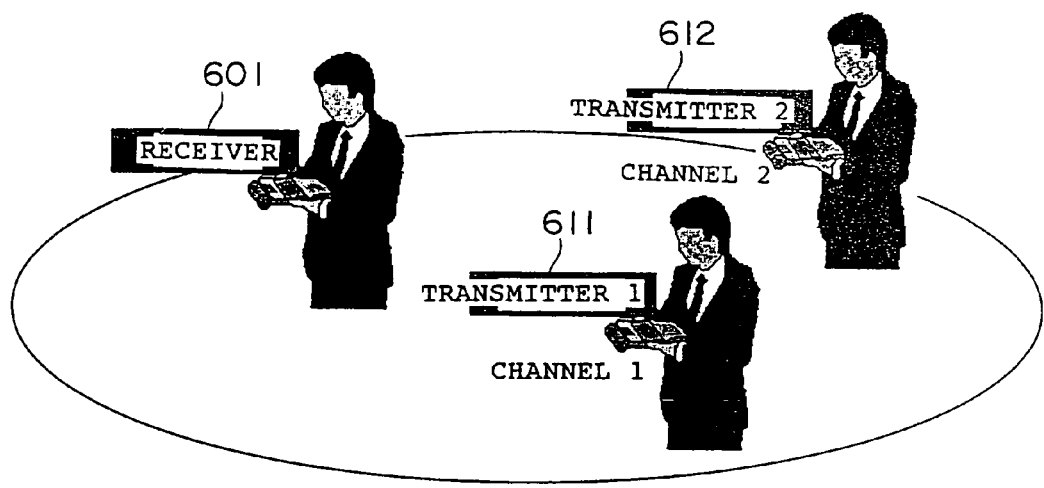
FIG. 6 is a conceptual view illustrating a case where there are two broadcasting data transmitters in the same local area according to the embodiment.
Figure 7:
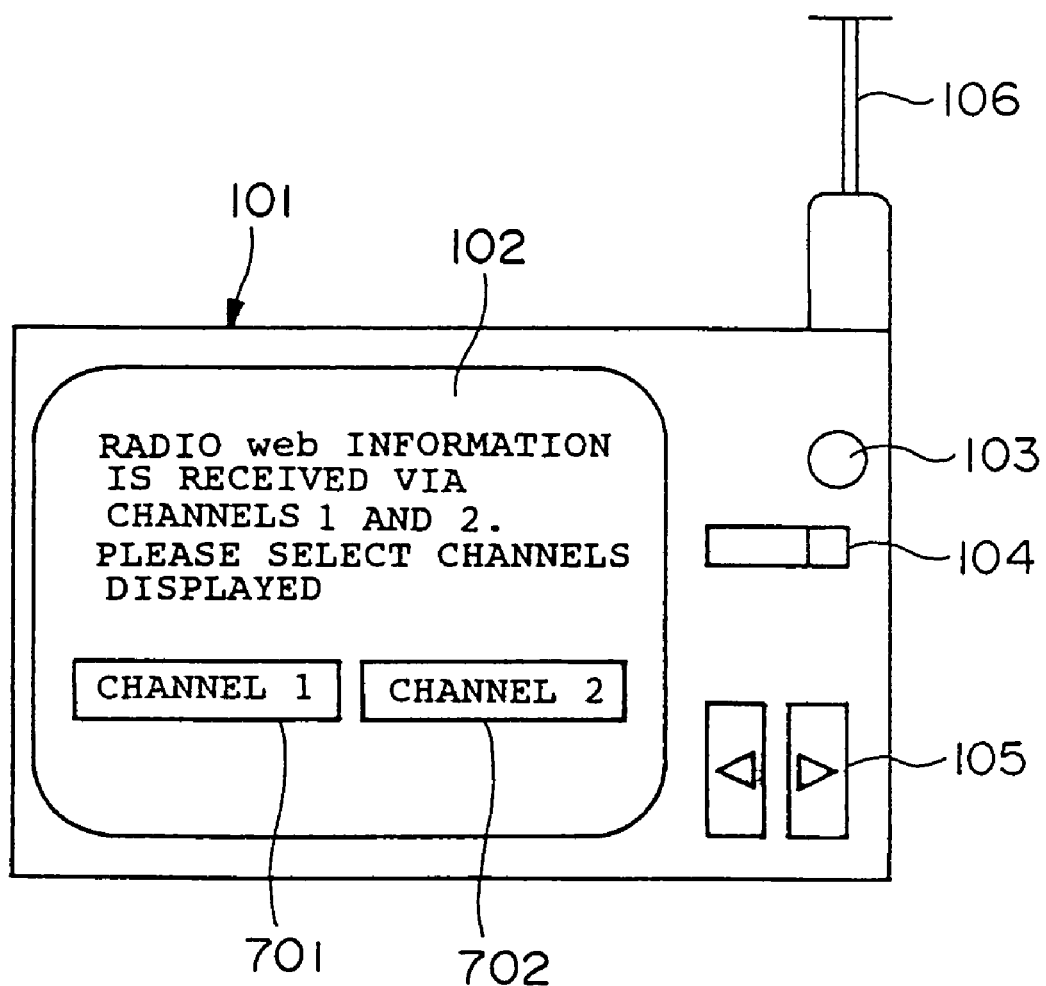
FIG. 7 is a view showing a selection menu on a display screen when the broadcasting data can be received through two channels within the same local area according to the embodiment.

An expression, "There are the plurality of on-the-broadcasting channels", given herein implies, as shown in FIG. 6, such a case that there are two transmitters 611 and 612 who are transmitting the broadcasting data by using the information processing apparatuses 101.

Displayed on the channel selection menu are button images of "channel 1" and "channel 2" together with a character message such as "Radio web information is received on the channel 1 and the channel 2. Select the channel for display". The channel selection button 105 is slid rightward or leftward to be pressed in this display state, and the channel 1 or the channel 2 can be thereby chosen (step 512). Note that the channel may also be selected by touching the butting image on the display screen 102 with a touch pen etc.

When the channel is established, the broadcaster ID is obtained from the above broadcasting information, and this ID is set in the memory RAM203 (step 504).

Next, the microprocessor 202 judges whether or not the broadcasting data have been encrypted (step 505), and, if encrypted, the encrypting processing unit 205 executes a decrypting process, i.e., a decoding process (step 506).

Next, the HTML browser stored in the memory (RAM203 or ROM204) is started up under the control of the microprocessor 202, and an HTML text created by the broadcaster shown in FIG. 3 is displayed on the display screen 102 through the image decoder 207 (step 507).

At this time, if the receiver desires to transmit a mail to the broadcaster (step 508), the receiver touches the mail.gif button image on the display screen 102 with the touch pen etc. With this receiver's operation, the mail editor stored in the memory (RAM203 or ROM204) is started up (step 509). The receiver is able to create a return mail on the basis of the mail editor. At this time, the broadcaster ID stored in the memory RAM203 is read as a destination of the return mail and written to a header of the mail.

Then, the mail editing based on the mail editor is completed, the microprocessor 202 transmits the mail to the information processing apparatus 101 of the broadcaster via the tuner 201 and the antenna 106.

As described above, according to the present invention, the bidirectional communications limited within the specified local area are actualized. The specified information can be provided as the broadcasting data to only the receivers existing especially within the local area concerned, and the receivers having received the information are capable of responding through the return mails to the broadcaster. It is therefore feasible to actualize the bidirectional communications at the stage just before the persons concerned meet directly each other.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A local area information terminal comprising:
   a file storing unit storing a file previously created;
   a channel retrieving unit comprising:
      a tuner, and
      a microprocessor connected to the tuner,
   the channel retrieving unit determining a free channel by using the tuner in conjunction with the microprocessor, among broadcasting channels allocated to respective frequency bandwidths and retrieving the free channel through which no broadcasting is being conducted;
   a channel selecting unit making, when there exist a plurality of free channels, a transmitter automatically select a free channel starting from a lower-number channel; and
   a transmitting unit transmitting the file as broadcasting data stored in said file storing unit to within a local area via the selected channel, wherein the channel comprises a bandwidth defined per frequency of the broadcasting.

2. A local area information terminal according to claim 1, further comprising a cipher processing unit,
   wherein the file read from said file storing unit is encrypted by said cipher processing unit and thereafter transmitted from said transmitting unit.

3. A local area information terminal according to claim 1, wherein the file is a file in an HTML format.

4. A local area information terminal selectively receiving broadcasting information transmitted via a plurality of channels within a local area, said terminal comprising:
   a retrieving unit comprising:
      a tuner, and
      a microprocessor connected to the tuner determining a free channel through which the broadcasting data can be received by using the tuner in conjunction with the microprocessor, said broadcasting data being transmitted via a channel of the plurality of channels automatically selected starting with a lower-number channel from among a plurality of free channels and retrieving the free channel through which no broadcasting is being conducted;
   a selecting unit selecting, when the broadcasting data different from each other are being transmitted via the plurality of channels, a receiving channel;
   a displaying unit displaying the broadcasting data received by the selected channel;
   an identifier storing unit extracting an identifier for specifying a transmitter out of the broadcasting data and storing the identifier;
   a mail editing unit creating a return message to the transmitter on the basis of the transmitter identifier read from said identifier storing unit; and
   a returning unit returning the mail created by said mail editing unit, wherein the broadcasting data being transmitted within the local area and the channel comprises a bandwidth defined per frequency of the transmitting.

5. A local area information terminal according to claim 4, further comprising a cipher processing unit, if the broadcasting data received have been encrypted, decoding the encrypted data by decrypting the same data.

6. A local area information terminal capable of transmitting and receiving broadcasting data within a local area, comprising:
   a file storing unit storing a file previously created;
   a channel retrieving unit comprising:
      a tuner, and
      a microprocessor connected to the tuner,
   the channel retrieving unit determining a free channel by using the tuner in conjunction with the microprocessor, among broadcasting channels allocated to respective frequency bandwidths and retrieving the free channel through which no broadcasting is being conducted;
   a transmitting unit transmitting the file as broadcasting data stored in said file storing unit to within a local area via the retrieved channel, said transmitting unit automatically selecting, when there exist a plurality of free channels, a free channel starting from a lower-number channel;
   a retrieving unit retrieving a channel through which the broadcasting data can be received within the local area;
   a selecting unit selecting, when the broadcasting data different from each other are being transmitted via the plurality of channels, a receiving channel; and
   a displaying unit displaying the broadcasting data received via the selected channel, wherein the broadcasting data being transmitted within the local area and the channel comprises a bandwidth defined per frequency of the transmitting.

7. A local area information terminal capable of transmitting and receiving broadcasting data within a local area according to claim 6, further comprising:
   a mail editing unit creating a return mail to a transmitter of the broadcasting data received; and
   a returning unit for returning the return mail.

8. A local area information terminal capable of transmitting and receiving broadcasting data within a local area according to claim 7, further comprising
   an identifier storing unit extracting an identifier for specifying a transmitter out of the broadcasting data and storing the identifier,
   wherein said mail editing unit sets a return destination of the return mail to the transmitter on the basis of the transmitter identifier read from said identifier storing unit.

9. A local area information terminal comprising:
a file storing unit storing a file previously created;
a channel retrieving unit comprising:
   a tuner, and
   a microprocessor connected to the tuner,
the channel retrieving unit determining a free channel by using the tuner in conjunction with the microprocessor, among broadcasting channels allocated to respective frequency bandwidths and retrieving the free channel through which no broadcasting is being conducted;
   a channel displaying unit displaying, when there exists a plurality of free channels, the plurality of free channels retrieved by the channel retrieving unit;
   a channel selecting unit making a transmitter automatically select a free channel from the plurality of free channels starting from a lower-number channel; and
   a transmitting unit transmitting the file as broadcasting data stored in said file storing unit to within a local area via the selected channel, wherein the broadcasting data being transmitted within the local area and the channel comprises a bandwidth defined per frequency of the transmitting.

10. A local area information terminal according to claim 9, further comprising a cipher processing unit,
   wherein the file read from said file storing unit is encrypted by said cipher processing unit and thereafter transmitted from said transmitting unit.

11. A local area information terminal according to claim 9, wherein the file is a file in an HTML format.

12. A local area information terminal selectively receiving broadcasting information transmitted via a plurality of channels within a local area, said terminal comprising:
   a retrieving unit comprising:
     a tuner, and
     a microprocessor connected to the tuner determining a plurality of free channels by using the tuner in conjunction with the microprocessor, and retrieving the plurality of channels through which no broadcasting is being conducted and through which the broadcasting data is received;
   a channel displaying unit displaying, when the broadcasting data different from each other are being transmitted via the plurality of channels, the plurality of channels retrieved by the retrieving unit;
   a selecting unit receiving input selecting a receiving channel from the plurality of channels;
   a displaying unit displaying the broadcasting data received by the selected channel;
   an identifier storing unit extracting an identifier for specifying a transmitter out of the broadcasting data and storing the identifier;
   a mail editing unit creating a return message to the transmitter on the basis of the transmitter identifier read from said identifier storing unit; and
   a returning unit returning the mail created by said mail editing unit, wherein the broadcasting is within the local area.

13. A local area information terminal according to claim 12, further comprising a cipher processing unit, if the broadcasting data received have been encrypted, decoding the encrypted data by decrypting the same data.

14. A local area information terminal capable of transmitting and receiving broadcasting data within a local area, comprising:
a file storing unit storing a file previously created;
a channel retrieving unit comprising:
   a tuner, and
   a microprocessor connected to the tuner,
the channel retrieving unit determining a free channel and by using the tuner in conjunction with the microprocessor, among broadcasting channels allocated to respective frequency bandwidths starting with a lower-number channel and automatically retrieving the free channel through which no broadcasting is being conducted;
   a transmitting unit transmitting the file as broadcasting data stored in said file storing unit to within a local area via the retrieved channel;
   a retrieving unit retrieving a channel through which the broadcasting data can be received within the local area;
   a channel displaying unit displaying, when the broadcasting data different from each other are being transmitted via the plurality of channels, the plurality of channels retrieved by the retrieving unit;
   a selecting unit selecting a receiving channel from the plurality of channels; and
   a displaying unit displaying the broadcasting data received via the selected channel, wherein the broadcasting data being transmitted within the local area and the channel comprises a bandwidth defined per frequency of the transmitting.

15. A local area information terminal capable of transmitting and receiving broadcasting data within a local area according to claim 14, further comprising:
   a mail editing unit creating a return mail to a transmitter of the broadcasting data received; and
   a returning unit for returning the return mail.

16. A local area information terminal capable of transmitting and receiving broadcasting data within a local area according to claim 15, further comprising
   an identifier storing unit extracting an identifier for specifying a transmitter out of the broadcasting data and storing the identifier,
   wherein said mail editing unit sets a return destination of the return mail to the transmitter on the basis of the transmitter identifier read from said identifier storing unit.

17. A local area information terminal comprising:
a file storing unit storing a file previously created;
a channel retrieving unit retrieving a free channel through which no broadcasting is being conducted, by using a tuner in conjunction with a microprocessor, from among broadcasting channels allocated to respective frequency bandwidths and judging whether the free channel exists or not;
a channel retrieving unit comprising:
   a tuner, and
   a microprocessor connected to the tuner,
the channel retrieving unit determining a free channel by using the tuner in conjunction with the microprocessor, among broadcasting channels allocated to respective frequency bandwidths and retrieving the free channel through which no broadcasting is being conducted;
   a channel display controlling unit controlling a display based on a judging result obtained by the channel retrieving unit;
   a channel selecting unit making a transmitter select a free channel from the plurality of free channels if the channel retrieving unit judges that there exists a plurality of free channels; and a transmitting unit transmitting the file as broadcasting data stored in said file storing unit to within a local area via the selected channel.

18. A local area information terminal selectively receiving broadcasting information transmitted via a plurality of channels within a local area, said terminal comprising:
   a channel retrieving unit comprising:
      a tuner, and
      a microprocessor connected to the tuner judging whether an on-broadcasting channel exists or not by using the tuner in conjunction with the microprocessor, through which the broadcasting data can be received and retrieving a channel through which no broadcasting is being conducted;
   a channel display controlling unit controlling a display based on a judging result obtained by the channel retrieving unit;
   a selecting unit selecting a receiving channel from a plurality of on-broadcasting channels if the retrieving unit judges that there exists the plurality of on-broadcasting channels;
   a displaying unit displaying the broadcasting data received by the selected channel;
   an identifier storing unit extracting an identifier for specifying a transmitter out of the broadcasting data and storing the identifier;
   a mail editing unit creating a return message to the transmitter on the basis of the transmitter identifier read from said identifier storing unit; and
   a returning unit returning the mail created by said mail editing unit.

19. A local area information terminal capable of transmitting and receiving broadcasting data within a local area, comprising:
   a file storing unit for storing a file previously created;
   a channel retrieving unit comprising:
      a tuner, and
      a microprocessor connected to the tuner judging whether a free channel exists or not by using the tuner in conjunction with the microprocessor, among broadcasting channels allocated to respective frequency bandwidths and retrieving the free channel through which no broadcasting is being conducted;
   a transmitting unit transmitting the file as broadcasting data stored in said file storing unit to within a local area via the retrieved channel if the channel retrieving unit judges that the free channel exists;
   a retrieving unit for retrieving a channel through which the broadcasting data can be received within the local area and judging whether the on-broadcasting channel exists or not;
   a channel display controlling unit controlling a display based on a judging result obtained by the channel retrieving unit;
   a selecting unit selecting a receiving channel from a plurality of on-broadcasting channels if the retrieving unit judges that there exists the plurality of on-broadcasting channels; and
   a displaying unit displaying the broadcasting data received via the selected channel.

20. A local area information terminal comprising:
   a channel retriever comprising:
      a tuner, and
      a microprocessor connected to the tuner,
   the channel retriever determining a free channel by using a the tuner in conjunction with the microprocessor, among a plurality of broadcasting channels allocated to respective frequency bandwidths and retrieving the free channel through which no broadcasting is being conducted;
   a channel selector automatically selecting, upon a plurality of free channels existing, a lowest-numbered channel of the plurality of free channels; and
   a transmitter transmitting a file as broadcasting data within a local area via the selected channel, wherein the selected channel comprises a bandwidth defined per frequency of the broadcasting.

* * * * *